Figure 1:
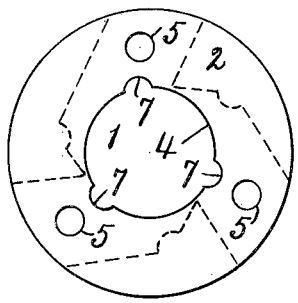

W. W. YOUNG.
ACOUSTIC DIAPHRAGM.
APPLICATION FILED JUNE 1, 1916.

1,224,102.

Patented Apr. 24, 1917.

WITNESS
A. C. Fairbanks

INVENTOR.
William W. Young,
BY Frank A. Cutter,
ATTORNEY.

UNITED STATES PATENT OFFICE.

WILLIAM W. YOUNG, OF AGAWAM, MASSACHUSETTS, ASSIGNOR TO L. A. YOUNG, OF AGAWAM, MASSACHUSETTS.

ACOUSTIC DIAPHRAGM.

1,224,102.  Specification of Letters Patent.  Patented Apr. 24, 1917.

Application filed June 1, 1916. Serial No. 101,182.

*To all whom it may concern:*

Be it known that I, WILLIAM W. YOUNG, a citizen of the United States of America, residing at Agawam, in the county of Hampden and State of Massachusetts, have invented a new and useful Acoustic Diaphragm, of which the following is a specification.

My invention relates to improvements in diaphragms for use in telephones, talking-machines, and the like, to reproduce sound, and consists essentially of a metallic, fibrous, or other vibratory member or bridge having points of suspension at the outer terminals of parts which extend from a central portion of greater or less area, and a metallic, fibrous, or other reproducing member or resonator. The bridge and resonator of any diaphragm may be of the same or different thickness, and either or both may or may not be perforated. The shape of the bridge may vary to a considerable extent, but whatever such shape may be, I find that three points of suspension give the best results.

The primary object of my invention is to produce a sound-reproducing device or diaphragm, applicable to or capable of being incorporated with any sound-reproducing instrument requiring a diaphragm, which is sufficiently sensitive to respond to the weaker vibrations, sufficiently strong and rigid to carry the stronger vibrations without blasting, rattling, or flatting out, and gives out or reproduces, under practically all conditions, sound waves that are full, clear, round, and natural. Even blasts on high vocal and instrumental notes, which are so common with ordinary diaphragms, are entirely eliminated or avoided by this diaphragm. These results are due to the suspended vibratory member or bridge provided with the reproducing member or resonator, since said bridge, with its larger central area and extensions therefrom which are supported at their outer ends or edges by the diaphragm-engaging and holding parts of the sound-reproducing instrument in which said diaphragm is located, is very elastic and sensitive to vibrations, and especially adapted to transmit the same without variation to said resonator, on the one hand, and said resonator, because of its shape, area, and position relative to said bridge, cushions, as it were, the vibrations received by it, and at the same time accurately reproduces such vibrations in the form of sound waves, on the other hand.

Other objects and advantages will appear in the course of the following description.

I attain the objects and secure the advantages of my invention by the means illustrated in the accompanying drawings, in which—

Figure 2:
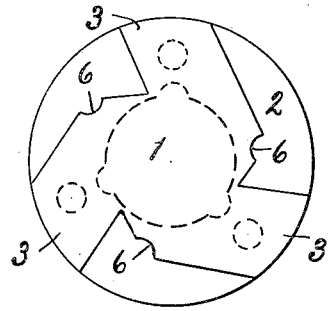
Figure 3:
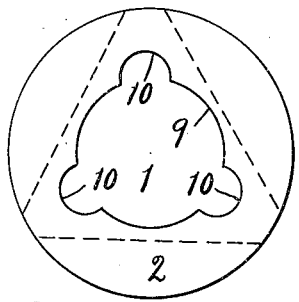
Figure 4:
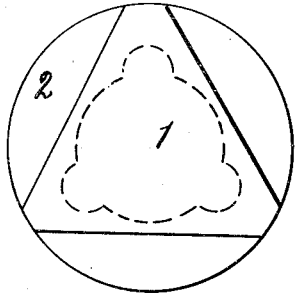
Figure 5:
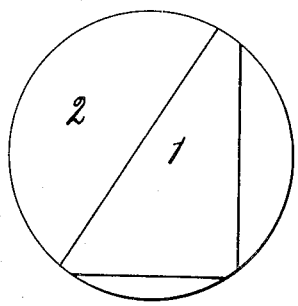
Figure 6:
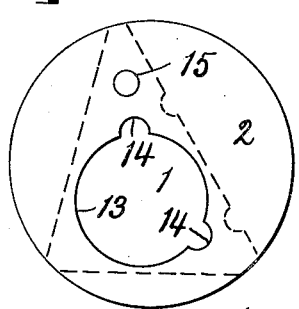
Figure 7:
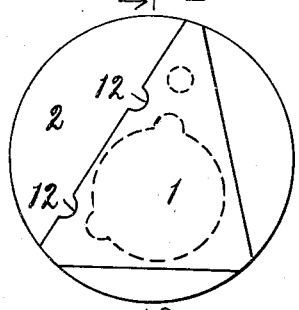
Figures 8, 9:
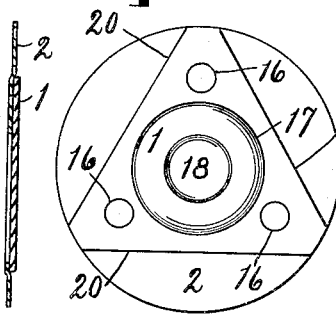
Figures 10, 11:
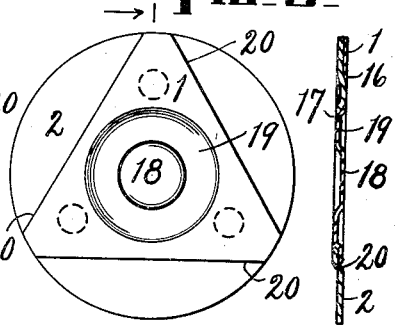
Figure 12:
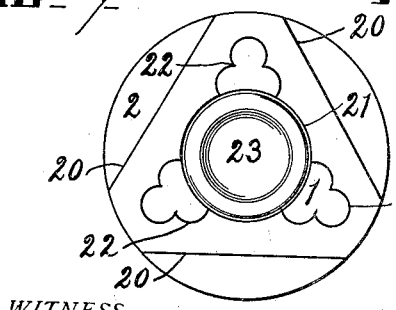
Figure 13:
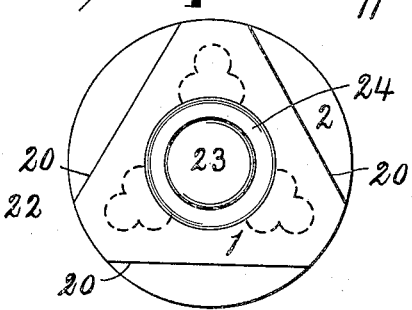

Figures 1 and 2 are plans of what may be termed obverse and reverse sides, respectively, of a diaphragm which embodies a practical form of the invention; Figs. 3 and 4 are similar plans of another practical form or embodiment of said invention; Fig. 5 is a reverse plan of still another embodiment of the invention; Figs. 6 and 7 are respectively obverse and reverse plans of a fourth diaphragm which like the others embodies the invention; Fig. 8 is a vertical section taken on lines 8—8, looking in the direction of the associated arrow, in Fig. 7; Figs. 9 and 10 are respectively obverse and reverse plans of a fifth example of the application of the invention; Fig. 11 is a vertical section on lines 11—11, looking in the direction of the associated arrow, Fig. 10, and, Figs. 12 and 13 are respectively obverse and reverse plans of a sixth example.

Similar reference numerals designate similar parts throughout the several views.

I have not by any means illustrated all of the shapes or forms that are available for my diaphragm and its two essential elements, but have shown a sufficient number fully to disclose my invention.

The bridge of a diaphragm for a telephone receiver being the part that comes into contact with the magnet in said receiver, it becomes necessary that such bridge be of metal, but in other cases bridges of metal, fiber, or other material may be employed, according to the demands of structural and other conditions.

In each example of the diaphragm illustrated in connection herewith, a bridge is indicated by the numeral 1 and a resonator by the numeral 2. These two members are present in every diaphragm, the first being on what I have termed the reverse side and the second being on what I have termed the obverse side.

Comparatively thin material is used for both the bridge 1 and the resonator 2 which comprise each diaphragm. Sometimes the bridge is thicker than the resonator, as in the diaphragm shown in Figs. 6, 7 and 8, and sometimes the bridge is thinner than the resonator, as in the diaphragm shown in Figs. 9, 10 and 11, but such differences in thickness are necessarily comparatively slight, and frequently there is no difference in thickness between the two members.

In the diaphragm shown in the first two views, the bridge 1 has three tangential arms 3 which constitute the three points of suspension, and the resonator 2 has a large central opening 4 covered by the central or main part of said bridge, and three small openings 5 covered by said arms. The outer ends of the arms 3, with the outer edge of the resonator 2, are, when the diaphragm is in place, held by the engaging parts (not shown) of the sound-reproducing device of a talking machine or of a telephone, and the bridge 1 thus supported receives the vibrations and transmits them to said resonator, which in turn reproduces them in sound-waves of superior quality. The bridge 1 being weaker at its extremities is possessed of the necessary flexibility, and the openings 4 and 5 in the resonator render the latter more flexible and make it capable of giving off the sound with the desired degree of volume and tone. The arms 3 may be indented more or less to enhance the action of the bridge, as shown at 6, and the large opening in the resonator may have extensions 7 to improve the result to be obtained from said resonator.

In this as in all other cases the bridge 1 and the resonator 2 are cemented or otherwise securely attached to each other.

The desired results are attained with the diaphragm shown in Figs. 3 and 4, by employing an equilaterally triangular bridge 1 having its points or angles cut off to provide adequate points of suspension. There is here present the central portion of larger area, as in the first diaphragm, and outwardly extending diminishing parts which correspond in a general way with the arms 3, and the resonator 2 has a central opening 9 and extensions 10 covered by the bridge 1, such opening and extensions being somewhat larger than the opening 4 and extensions 7.

In the Fig. 5 diaphragm, the bridge 1 is in the form of a right-angle triangle having its angles removed for a similar reason as before. The resonator 2 is so attached to this bridge that unequal portions of said resonator extend beyond the three side edges of said bridge. There are no indentations or perforations in either the bridge or the resonator in this example. Again is to be found the central bridge portion of larger area, and the diminishing outlying parts that serve as the points of suspension of the bridge, together with the attached resonator, and the same thing is true of the succeeding examples.

Since the Fig. 5 resonator 2 is imperforate, it is conceived to be feasible to leave a considerable undivided area thereof unsupported by the bridge, as has been done, in order to obtain the desired action on the part of said resonator.

The same general relative arrangement of the bridge 1 and the resonator 2, in the diaphragm shown in Figs. 6, 7 and 8, obtains as in the preceding example, but here the bridge is an acute-angled triangle and has indentations 12 in its longest side, similar to the indentations 6 in the first bridge, and the resonator has a large opening 13 with two extensions 14, and a small opening 15. The openings 13 and 15 and the extensions 14 are all covered by the bridge, said extensions and said opening 15 being located adjacent to the longest side of said bridge, and said opening 13 being necessarily offset relative to the center of the resonator.

In the diaphragm shown in Figs. 9, 10 and 11, the bridge 1 is an equilateral triangle without points, and has openings 16 adjacent to its ends into which are forced or pressed contiguous portions of the resonator 2, and the latter has a large central opening 17 into which is pressed the corresponding portion of said bridge. A boss 18 is left in the center of the indented central portion of the bridge 1, thus leaving an annular channel 19 in the reverse side of said bridge.

The bridge may be countersunk in the reverse side of the resonator, if desired, instead of having the latter merely placed flat against the former without indentation in the contiguous surface of either. The diaphragm last above described is an example of such a countersunk bridge, which bridge is let into the resonator along lines 20 in Figs. 9 and 10, and as represented at 20 in Fig. 11.

Another example of a diaphragm having its bridge countersunk in the resonator appears in the last two views, the outlines of the countersink being indicated, as in Figs. 9 and 10, by the numeral 20. The diaphragm of Figs. 12 and 13 is generally very similar to the preceding one, the principal difference being that in the last diaphragm a central opening 21 in the resonator 2 has trefoil extensions 22, and there are no openings 16 in the bridge 1. The central portion of the bridge is here, as in the other case, pressed into the opening 21 and formed into a boss 23 in the center and an annular channel 24 between said boss and the edges of said opening.

Any of the diaphragms illustrated in the drawings, in addition to the last two, may have countersunk bridges.

From the foregoing it is clear that I should not be unduly restricted by what I have illustrated in the drawings.

One of the principal reasons for perforating the resonators is for the purpose of reducing the mass of material in the diaphragms. Since the diaphragms must be practically airtight, any opening through a resonator must be covered by the attached bridge or other means.

What I claim as my invention, and desire to secure by Letters Patent, is—

1. An acoustic diaphragm comprising a vibratory member consisting of a central portion with extensions therefrom to form points of suspension, and a perforated reproducing member attached to said first-mentioned member, said vibratory member covering the perforation in said reproducing member.

2. An acoustic diaphragm comprising a vibratory member consisting of a central portion with extensions therefrom to form points of suspension, and a perforated reproducing member attached to said vibratory member, said first-mentioned member covering the perforation and in part being upset into said reproducing member.

3. An acoustic diaphragm comprising a vibratory member consisting of a central portion having extensions to form a plurality of points of suspension, and a reproducing member attached to said vibratory member, the latter being of less area than and countersunk in said reproducing member.

4. An acoustic diaphragm comprising a vibratory member consisting of a central portion with extensions therefrom to form points of suspension, and a perforated reproducing member attached to said vibratory member, said vibratory member covering the perforation and being countersunk in said reproducing member.

5. An acoustic diaphragm comprising a vibratory member consisting of a central portion with extensions therefrom to form points of suspension, and a perforated reproducing member attached to said vibratory member, said vibratory member covering the perforation and being countersunk and in part upset in said reproducing member.

WILLIAM W. YOUNG.

Witnesses:
F. A. CUTTER,
A. C. FAIRBANKS.